INVENTOR.
ALFRED E. MANN
BY
Elliott & Pastoriza
ATTORNEYS

United States Patent Office 3,575,721
Patented Apr. 20, 1971

3,575,721
SOLAR CELL ARRAYS AND CONNECTORS
Alfred E. Mann, Sylmar, Calif., assignor to Textron Inc.
Filed Apr. 26, 1965, Ser. No. 450,597
Int. Cl. H01k 15/02
U.S. Cl. 136—89                                    5 Claims

ABSTRACT OF THE DISCLOSURE

An electrical connector arrangement for interconnecting an array of solar cells includes an elongated, flexible strip formed with laterally projecting tabs attached to adjacent rows of solar cells. The tabs are dimensioned and attached so as to preserve electrical continuity between various cells in the event that cell cracking occurs that otherwise would disrupt electrical continuity. The flexible strip incorporates short tabs projecting from one side for connection with a top electrode of one cell and at least one extended tab laterally projecting from the other strip side for connection with the bottom electrode of an adjacent cell. The extended tab bridges across the major portion of the bottom of the adjacent cell and is connected thereto only at points beyond the midpoint of the adjacent cell. Cracks splitting the cell in half are then prevented from completely incapacitating the solar cell.

---

This invention relates generally to solar cell arrays and more particularly to the electrical and mechanical interconnections between the individual cells making up the array.

It is presently common practice to provide an array of solar cells to generate electrical energy from solar radiation for use in earth satellites as well as other space craft. Since each cell itself generates only a small amount of power, the required voltage and current is realized by inter-connecting the cells in a series and parallel matrix. In such arrays, the cells making up the matrix may be substantially coplanar or, alternatively, in a shingled array.

In the past, the various series and parallel connections between the cells have been rigid with the result that many failures have occurred in the overall solar cell array. The failures are principally a result of the enormous stresses to which the cells are subjected by environmental factors such as extremely low temperatures as occur in outer space. The stresses resulting from thermal expansion and contraction often crack the cells as well as the rigid connections between the cells.

In United States Pat. No. Re. 25,647, entitled Solar Cell System, and United States Pat. No. 3,340,096 entitled Solar Cell Array, there are disclosed improved solar cell arrays in which resilient strip like conductors are employed for effecting electrical and mechanical interconnections between the cells in the array in such a manner as to accommodate slight relative shifting of the cells with respect to each other. By thus avoiding the use of rigid electrical interconnections, many of the failures of solar cell arrays resulting from shifting of the cells relative to each other have been eliminated.

However, there still exists the problem of loss of power from the overall array as a consequence of one or more of the cells cracking. For example, while considerable redundancy is provided in the various series and parallel interconnections between the cells of the array, if one cell should become destroyed or cracked in one of the series arrays, the circuit continuity in that particular series or column of cells is lost, although the loss is not as serious as would result if there were not redundancy in the parallel and series connections with adjacent columns of cells. Moreover, if a cell cracks the cell itself is usually rendered totally ineffective. However, certain surface portions could still deliver power if proper connections were made thereto.

With the foregoing in mind, it is a primary object of the present invention to provide an improved solar cell array and connectors for the cells in the array in which the risk of disrupting the electrical continuity as a consequence of cracking of any one or more of the cells in portions of the array is substantially reduced.

More particularly, it is an object to provide improved electrical connectors in the form of resilient strips between various cells in an array which satisfy all of the various objects set forth in the above-mentioned patents and which, in addition, will normally retain electrical continuity between various cells in a series array even though one or more of the cells crack.

Another important object is to provide improved solar cell arrays and connectors in which even though one or more cells may crack, at least portions of the cracked cells themselves will still be useful in generating power so that the reduction in overall power is less than would be the case with prior art type interconnections between the cells.

Still another important object of this invention is to provide interconnections between cells in a solar cell array which do not appreciably detract from the maximum solar energy receiving areas of the various cells to the end that maximum energy may be derived from an array of given size and weight whether such array be of the coplanar or shingled type.

Briefly, these and many other advantages and objects of this invention are attained by providing a connector for solar cells in the form of a flexible strip portion having at least one short tab laterally projecting from one side for connection to a top electrode on one of the cells and at least one extended tab laterally projecting from the other side to a bottom electrode of another cell, the length of the extended tab being greater than one-half the length of the cell to which it is connected. By this arrangement, series continuity is maintained should a cell crack at an area inside the point of connection of the extended tab to the bottom electrode.

In preferred embodiments of the invention, the flexible conducting strips are designed to effect both series and parallel connections between, respectively, cells in a column and cells in a row. Towards this end, the strip means comprises an elongated continuous central strip portion running between adjacent rows of cells and having a plurality of short tabs laterally projecting from one side and connected to the top electrodes of the cells in one of the rows and a plurality of both short and extended tabs laterally projecting from its other side and connecting to the bottom electrodes of the cells in the next row, the extended tabs connecting to the bottom electrodes at points beyond the middle of the cells.

With the foregoing arrangement, there is provided resilient series connections for the cells in a column and resilient parallel connections for the cells in the rows.

A better understanding of the invention as well as various preferred embodiments thereof will be had by now referring to the accompanying drawings, in which.

Figure 1:
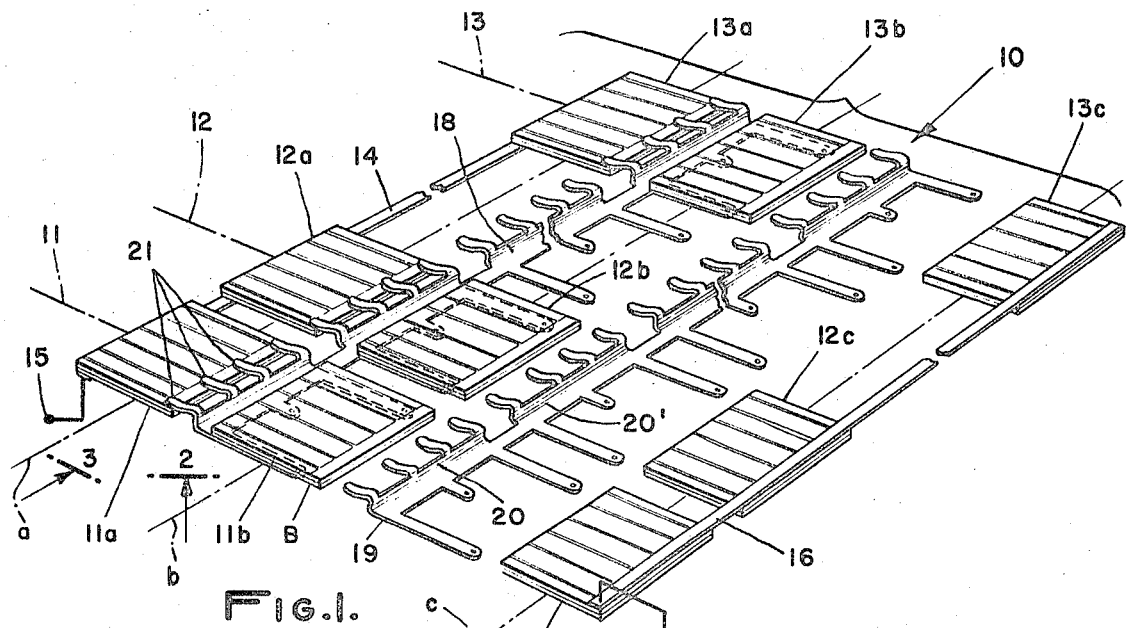
FIG. 1 is a fragmentary perspective view, partly exploded, showing a solar cell array employing connectors in accordance with the invention.

Referring first to FIG. 1, there is illustrated a solar cell array including a plurality of solar cells in end to end relationship to define columns of cells such as indicated by the dashed lines at 11, 12, and 13. The various cells in the columns are in side by side relationship to define rows of cells indicated by the dashed lines a, b, and c. The cells themselves making up the columns and rows are shown at 11a, 11b, and 11c for the column 11; 12a, 12b and 12c for the column 12; and, 13a, 13b and 13c for the column 13. With the designation, it will be clear that the cells 11a, 12a, and 13a make up a first row; the cells 11b, 12b, and 13b make up a second row; and the cells 11c, 12c, and 13c make up a third row. It will be understood that many more cells may be included in each column and row than are shown.

Each cell is provided with a top electrode T along its upper end edge connecting with the various parallel pick up paths on the active upper surface and a bottom electrode B normally covering the entire underside of the cell.

The cells in each of the columns are connected in series and the cells in each of the rows are connected in parallel to provide a series-parallel matrix of cells. Energy is derived between a first flexible conductive strip 14 connecting all of the bottom electrodes of the cells in the row a to a terminal 15, and a flexible conducting strip 16 connecting all of the top electrodes of the last row of cells c to a terminal 17.

The series and parallel connections of the intermediate rows are effected in accordance with the invention by elongated strip means 18 and 18 disposed between adjacent rows of cells. The last row of cells, 11c, 12c, and 13c, are shown exploded from the strip means 19, the strip itself also being exploded from the second row of cells so that it may be illustrated clearly.

Referring now to the bottom plan view of FIG. 2, details of the flexible conducting strip effecting the desired connections will be described. Since the strips 18 and 19 are identical, detailed description of one will suffice for both. As shown, the strip 18 includes an elongated continuous central strip portion 20 running generally parallel to the end edges of the cells 11a and 11b. A plurality of short tabs 21 project laterally from one side of the central strip portion 20 to connect to the top electrode T of the cell 11a. Extended tabs 22 and 23 in turn laterally project from the other side of the central portion of the strip 20 to connect to the bottom electrode B of the cell 11b. In accord with an important feature of this invention, the connections of the extended tabs are effected at a point beyond the middle of the cell 11b as indicated at 22′ and 23′ and, in the embodiment illustrated, these connections are adjacent to the far corners of the cell. Also, a short tab 24 extends from the other side of the strip between the extended tabs 22 and 23 and connects to the bottom electrode B as at 24′.

Figures 2, 3:
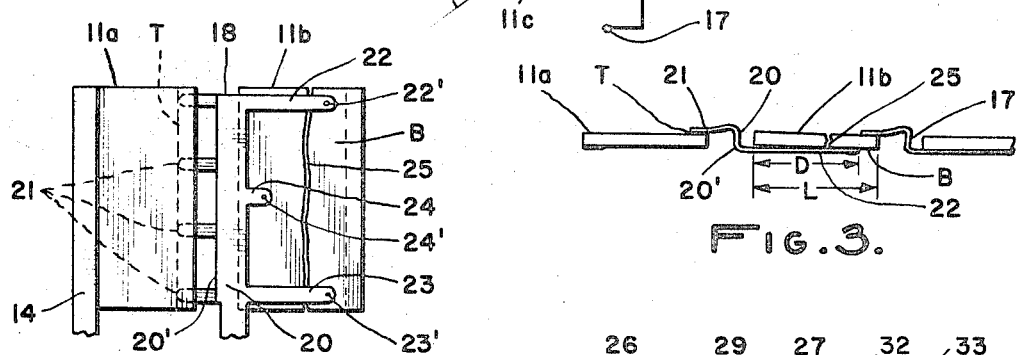
FIG. 2 is a bottom plan view of two of the cells looking in the direction of the arrow 2 of FIG. 1.
FIG. 3 is a fragmentary side elevational view of the cells looking in the direction of the arrow 3 of FIG. 1.

In FIG. 3, the foregoing connections are illustrated in side elevation wherein it will be noted that in the case of a coplanar array as shown in FIG. 1, the central strip portion 20 includes a fold line 20′ so that the level of the short tabs 21 is higher than the level of the extended tabs to accommodate the thickness of the cells so that the series connections can be effected and a coplanar configuration still maintained.

In FIG. 3, the length of the cell is indicated at L and the distance of the extended tab to the point where it connects to the bottom electrode B of the cell is indicated at D. It will be noted that this distance of the extended tab is greater than half of the length of the cell and will thus result in the connection point to the bottom electrode being beyond or past the middle of the cell.

With reference once again to FIG. 2, the extended tab and short tab configurations are such that they define an E-shaped pattern. This configuration has been found desirable from an ease of manufacturing point of view. It should be understood, however, that other configurations may be employed for effecting connections between the central strip portion 20 and the bottom electrode B of the cell, it always being a constraint that at least one extended tab be provided which connects to the bottom electrode beyond the midpoint of the cell and preferably as close to the far end edge of the cell as is feasible.

As a consequence of the foregoing connections, it will be clear that if the cell such as the cell 11b, should crack as indicated at 25, the continuity in the series circuit will not be disrupted, since the current will be carried through the extended tabs 22 and 23 beyond the crack 25. Moreover, the portion of the cell to the right of the crack will still function to provide electrical energy. Because of the short tab connection at 24′, the portion of the cell to the left of the crack 25 as viewed in FIG. 2 may also provide energy, assuming that the current pick-up paths on the top surface of the cell are still intact.

It will also be appreciated that as a consequence of the use of the flexible strip material as shown and described, the connections between the various cells are not rigid but rather are flexible so that relative shifting of the cells can be accommodated by the connections and thus the possibility of cracking of the cells as a consequence of such relative shifting is substantially reduced. The various features of the flexible type interconnections as described in the heretofore referred to patents are therefore realized by the present connecting strips.

Figure 5:
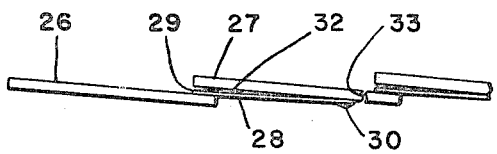
FIG. 5 is a side elevational view looking in the direction of the arrows 5—5 of FIG. 4; and, FIG. 6 is a bottom plan view of the cells and interconnections illustrated in FIG. 5.
Figures 4, 6:
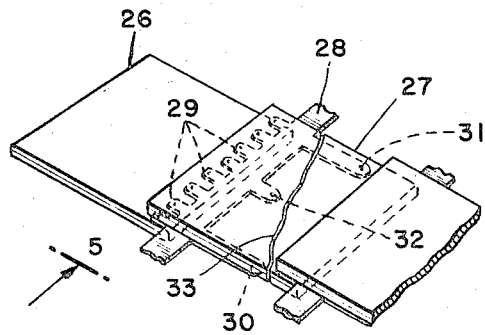
FIG. 4 is a fragmentary perspective view of a portion of a modified type of cell array.

FIGS. 4 and 5 illustrate a portion of a shingled array including cells 26 and 27 and incorporating an elongated strip 28 for interconnecting the cells. The strip itself includes a plurality of short tabs 29 connecting to the top electrode of the cell 26 and extended tabs 30 and 31 connecting to the bottom electrode of the cell 27 at points beyond the middle of the cell. There is also provided a short tab 32 from the central strip portion 28 connecting to the bottom electrode.

In FIGS. 4 and 5 the cell is shown as cracked at 33, the crack running almost diagonally across the cell. While the point of connection of the extended electrode 30 may fall within the area before the crack, the extended electrode 31 is connected to the bottom electrode beyond the crack 33 and thus serves to maintain electrical continuity and also render at least half the cell useful in providing energy.

FIG. 6 is a bottom plan view of a different type of extended tab configuration which may be employed with either the coplanar array or shingle type array described in FIGS. 4 and 5. In FIG. 6 there is shown a pair of cells 34 and 35 connected in series by means of a central strip portion 36 having short tabs 37 projecting laterally from one side to connect to the top electrode of the cell 34 and extended tab means 38 and 39 connecting to the bottom electrode of the cell 35. In the embodiment of FIG. 6, the extended tabs 38 and 39 converge towards each other to connect to the bottom electrode B at a common terminal 40. There is also provided a short tab 41 between the initial portion of the extended tabs 38 and 39.

The foregoing configuration is useful for elongated cells wherein the common electrical connecting point of the extended tabs 38 and 39 provides sufficient strength for the interconnections yet still permits sufficient flexibility between the cells.

In the embodiment of FIG. 6, it will be evident that if the cell cracks at any point between the electrical connections as at 40 and 41, there will still be retained electrical continuity in the series circuit.

It should be understood in the configurations of FIGS. 4, 5 and 6, that the central strip portion 28, as in FIGS. 4 and 5, and 36 as viewed in FIG. 6, may extend beyond the sides of the cells and include further laterally projecting tabs and extending tabs for connection to adjacent cells to provide the parallel connections between the cells in adjacent rows as described in conjunction with the coplanar array of FIG. 1.

From the foregoing description, it is believed evident that the present invention has provided improved solar cell arrays and connectors therefor wherein all of the various advantages set forth in the heretofore mentioned patents are realized with the added advantage of maintaining circuit continuity even though one or more of the cells may crack.

In respect to the foregoing, it should be understood that the flexible strip material is resilient in nature and the short tabs will usually include stress relief curves as illustrated in the drawings to accommodate relative shifting between the cells.

While only certain configurations of the connectors have been shown and described, variations that fall clearly within the scope and spirit of this invention will occur to those skilled in the art. The solar cell arrays and connectors are therefore not to be thought of as limited to the specific embodiments set forth merely for illustrative purposes.

What is claimed is:

1. A solar cell array including, in combination: a plurality of solar cells each having a conductive bottom surface defining a bottom electrode and a top electrode extending along the upper end portion to define a top electrode, said cells being in end to end relationship to define columns of cells and in side by side relationship to define rows of cells; strip means disposed between adjacent rows of cells for connecting the cells in each row in parallel with each other and for connecting the cells in each column in series with each other, the strip means between two adjacent rows comprising an elongated continuous central strip portion having a plurality of short tabs laterally projecting from one side and connected to the top electrodes of the cells in one of said rows and a plurality of short and extended tabs laterally projecting from its other side and connecting to the bottom electrodes of the cells in the other of said rows, said extended tabs bridging across a major portion of said bottom electrodes and connecting thereto only at points beyond the middle of said cells whereby circuit continuity is retained through at least some of said extended tabs in the event a cell should crack at an area inside the connection of its extended tab.

2. An array according to claim 1, in which two extended tabs and one short tab are provided for connection to the bottom electrode of each cell in a row, the two extended tabs running adjacent to the marginal side edges of the cell and the short tab running between the two extended tabs and terminating short of the middle of the cell so that said two extended tabs and one short tab define an E shaped pattern when viewed from the bottom.

3. An array accordign to claim 1, in which two extended tabs and one short tab are provided for connection to the bottom electrode of each cell in a row, the two extending tabs converging towards each other to terminate in a common connection joint adjacent to the far end portion of said bottom electrode and the short tab running between the two extended tabs and terminating short of the middle of said cell.

4. An array according to claim 1, in which said cells are substantially coplanar, said elongated continuous central strip having a longitudinal fold thereinto position the said one side from which said short tabs project at a higher level than its said other side from which said short and extended tabs project to accommodate the thickness of said cells in connecting the top and bottom electrodes in series.

5. An array according to claim 1, in which the cells in each column overlap each other to define a shingled array.

References Cited
UNITED STATES PATENTS

| | | | |
|---|---|---|---|
| 3,053,926 | 9/1962 | Ben-Sira et al. | 136—89 |
| 3,268,366 | 8/1966 | Guyot | 136—89 |
| 3,330,700 | 7/1967 | Golub et al. | 136—89 |
| 3,340,096 | 9/1967 | Mann et al. | 136—89 |

FOREIGN PATENTS

| | | | |
|---|---|---|---|
| 1,373,773 | 8/1964 | France | 136—89 |

WINSTON A. DOUGLAS, Primary Examiner

M. J. ANDREWS, Assistant Examiner